US006003852A

United States Patent [19]

Kawamura

[11] Patent Number: 6,003,852

[45] Date of Patent: Dec. 21, 1999

[54] ASSEMBLY DEVICE FOR A WIRING HARNESS

[75] Inventor: Hiroshi Kawamura, Yokkaichi, Japan

[73] Assignee: Sumitomo Wiring Systems, Ltd., Japan

[21] Appl. No.: 08/918,265

[22] Filed: Jun. 9, 1997

[51] Int. Cl.[6] .......... B23Q 3/00

[52] U.S. Cl. .......... 269/287; 269/296; 269/903

[58] Field of Search .......... 269/902, 903, 269/254 R, 156, 296, 126, 287; 294/99.1, 110.1, 19.2

[56] References Cited

U.S. PATENT DOCUMENTS

| | | | |
|---|---|---|---|
| 2,487,997 | 11/1949 | West | 269/254 |
| 3,913,202 | 10/1975 | Pyle et al. . | |
| 4,337,934 | 7/1982 | Caveney | 269/903 |
| 4,704,775 | 11/1987 | Cross | 269/903 |
| 4,807,421 | 2/1989 | Araki et al. | 269/254 R |
| 4,877,228 | 10/1989 | Ripert | 269/903 |
| 5,044,312 | 9/1991 | Guenther et al. | 269/254 R |

FOREIGN PATENT DOCUMENTS

| | | |
|---|---|---|
| 0 688 072 | 12/1995 | European Pat. Off. . |
| 4-61817 | 5/1992 | Japan . |
| 5-17853 | 3/1993 | Japan . |
| 9-17252 | 1/1997 | Japan . |

*Primary Examiner*—Robert C. Watson
*Attorney, Agent, or Firm*—Banner & Witcoff, Ltd.

[57] ABSTRACT

An assembly device for a wiring harness comprises a fork (11) having legs (12,13) and a closure (17). One of the legs (12) is rigid, and the other leg (13) and the closure (17) are relatively flexible to permit wires to enter the fork with ease and to permit the completed harness to be extracted with ease. A second embodiment has two rigid legs (12*a*,12*b*).

11 Claims, 4 Drawing Sheets

ASSEMBLY DEVICE FOR A WIRING HARNESS

The present invention relates to an assembly device for a wiring harness, and particularly to a fork in which individual wires of a harness can be temporarily retained during manufacture of the harness.

BACKGROUND TO THE INVENTION

A wiring harness comprises a large number of wires of different length and thickness arranged to connect a plurality of relatively remote electrical devices. Such a harness is used for example in an automobile. Typically the harness will have a central trunk region, through which many of the wires pass, and a large number of branches having relatively few wires. Automobile wiring harnesses can be very complex, with a core region of e.g. 30–50 individual wires, and 20–30 branches of different lengths and thicknesses.

The manufacture of wiring harnesses is relatively labour intensive. The wires are placed one by one on an assembly template, and when complete the individual wires are bound with tape to form the harness. Since the harness includes many wires, it is desirable to temporarily retain each wire in a clip as it is added to the template; in this way the wires are retained in the desired pattern, and individual wires cannot escape from the template. Such clips should permit the attachment of individual wires and removal of the completed harness with maximum speed and minimum effort. Preferably the clip should be no larger than the diameter of the completed harness so as to facilitate tight binding of the wires.

JP-4-61817 discloses a rigid fork with two legs each having an end cap with a resilient arm. These arms are directed towards each other to substantially close the opening of the fork. Wires are snapped one at a time past the arms into the fork for temporary retention. This device has the disadvantage that the caps can be pulled off the fork legs as the completed harness is pulled out of the fork. Furthermore the arms tend to restrict the fork opening when they are bent as the harness is released, and thus the fork must be oversize if ease of use is to be maintained. As noted above, an oversize fork does not facilitate tight binding of the wires, and has the disadvantage of taking up excessive space which prevents several forks being placed close together. A single arm embodiment is also disclosed in this prior document, but the same disadvantages arise.

JP-5-17853 discloses a fork having a fixed leg, and a pivoted leg biased towards the fixed leg by a spring. In the normal state the opening of the fork is not completely closed, leading to the possibility that individual wires will escape. The pivoted leg allows the completed harness to be removed with ease, but the clip is excessively complicated, rather expensive and somewhat slow to release.

JP-9-11252 discloses a fork in which both legs are pivoted on a stand, and biased by a spring to a completely closed condition This fork is completely closed in the normal condition and will thus retain individual wires securely. However the construction is somewhat complex and expensive, and the fork has a wide lateral extent which may restrict operability in the case where several clips must be placed close together.

The present invention aims to provide an improved device for temporarily restraining wires of a harness and which overcomes the problems of the prior art.

SUMMARY OF THE INVENTION

According to the invention there is provided assembly device for releasably retaining the wires of a wire harness and comprising a fork having a first substantially rigid leg and second relatively flexible leg, the legs defining a space therebetween with an opening between the ends thereof, and a closure for said opening, the closure extending from one of said legs to the other leg so as to substantially close said opening, and the closure being adapted to open said opening to permit the passage of wires therethrough.

Such a device has the advantage that since one of the legs is flexible, the fork opening is not restricted by the closure when the completed harness is released. Thus the fork can be a close fit around the harness which facilitates tight binding. The device is preferably no wider than the fork itself, and thus does not prevent several such devices being placed close together, if necessary.

Preferably the closure is mounted on one of the legs and comprises a flexible arm. This arrangement facilitates wires being snapped into the fork, and the completed harness being snapped out. No external springs are necessary.

In a preferred embodiment the closure is a resilient elastomeric leaf and may extend towards the base of the fork so as to facilitate entry of wires Preferably the closure is mounted on the relatively flexible leg, and may be more flexible than this leg so as to minimise bending of the flexible leg as wires are inserted.

The device may include a third rigid leg defining a second fork and second space, the spaces of the first and second legs being substantially orthogonal, and the closure extending between the ends of the three legs so as to substantially close both fork openings.

Such a three-legged fork is especially useful when forming a branch of a wiring harness in which branch wires approach from both directions along the main trunk. Tight binding of the wires close to the branch junction is facilitated since a fork leg need not have individual wires extending on both sides thereof.

The legs of the device may be relatively adjustable to increase the size of the fork, for example by slot and peg connection to suit different diameters of harness.

BRIEF DESCRIPTION OF DRAWINGS

Other features of the invention will be apparent from the following description of several preferred embodiments shown by way of example only in the accompanying drawings in which.

Figure 3:
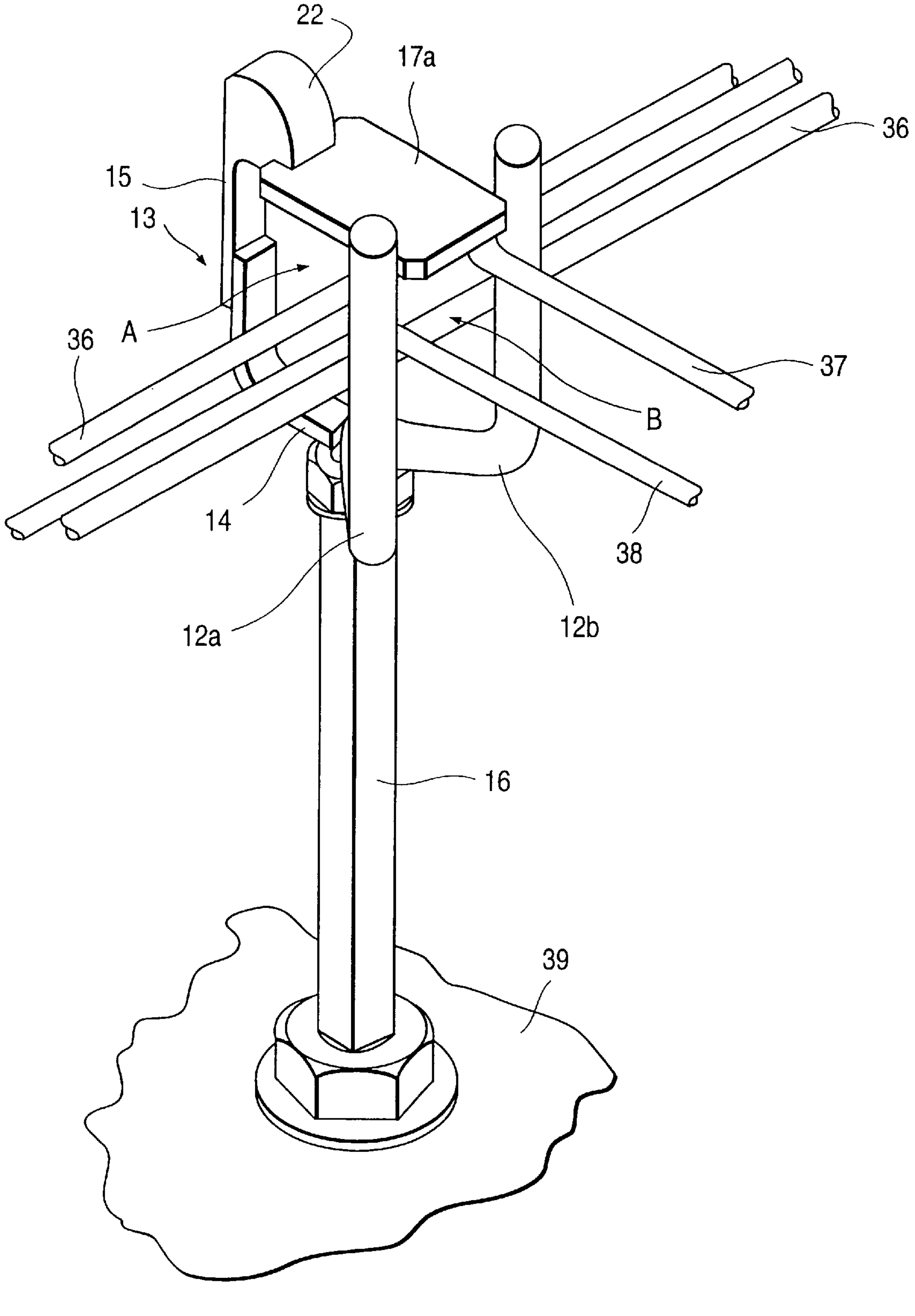
Figure 4:
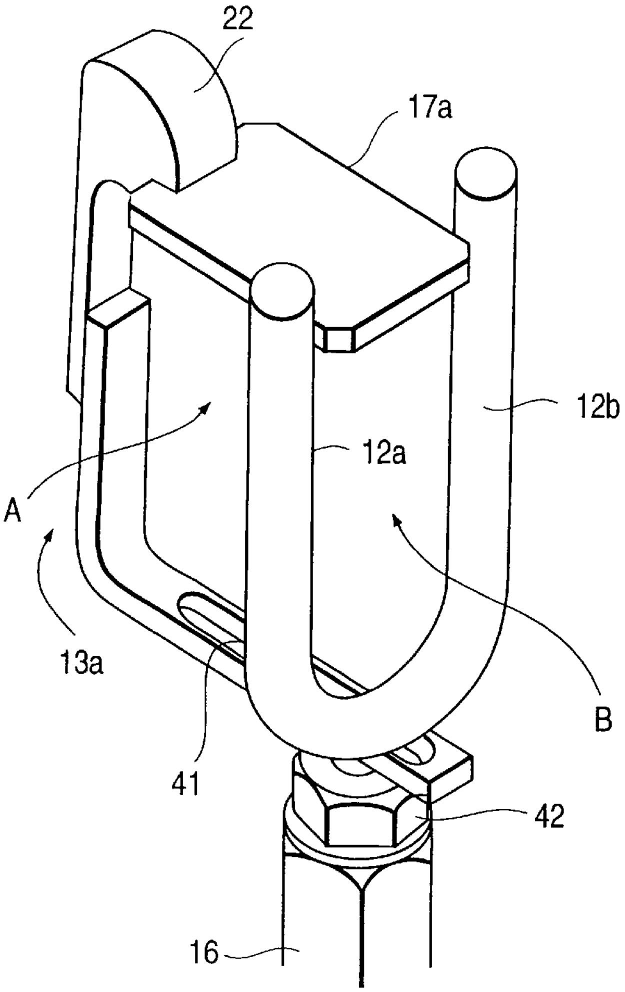
Figure 5:
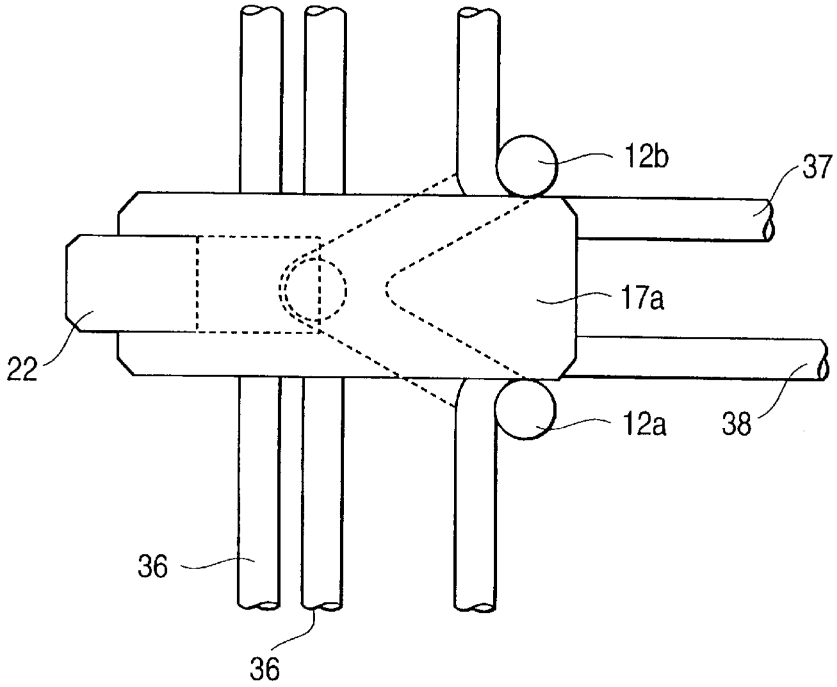

FIGS. *2a–2d* show the first embodiment of the invention in elevation, in successive stages of operation;

FIG. 3 is an perspective view of a second embodiment of the invention;

FIG. 4 is a plan view of the second embodiment;

FIG. 5 illustrates a modification of the second embodiment.

DESCRIPTION OF PREFERRED EMBODIMENTS

Figure 1:
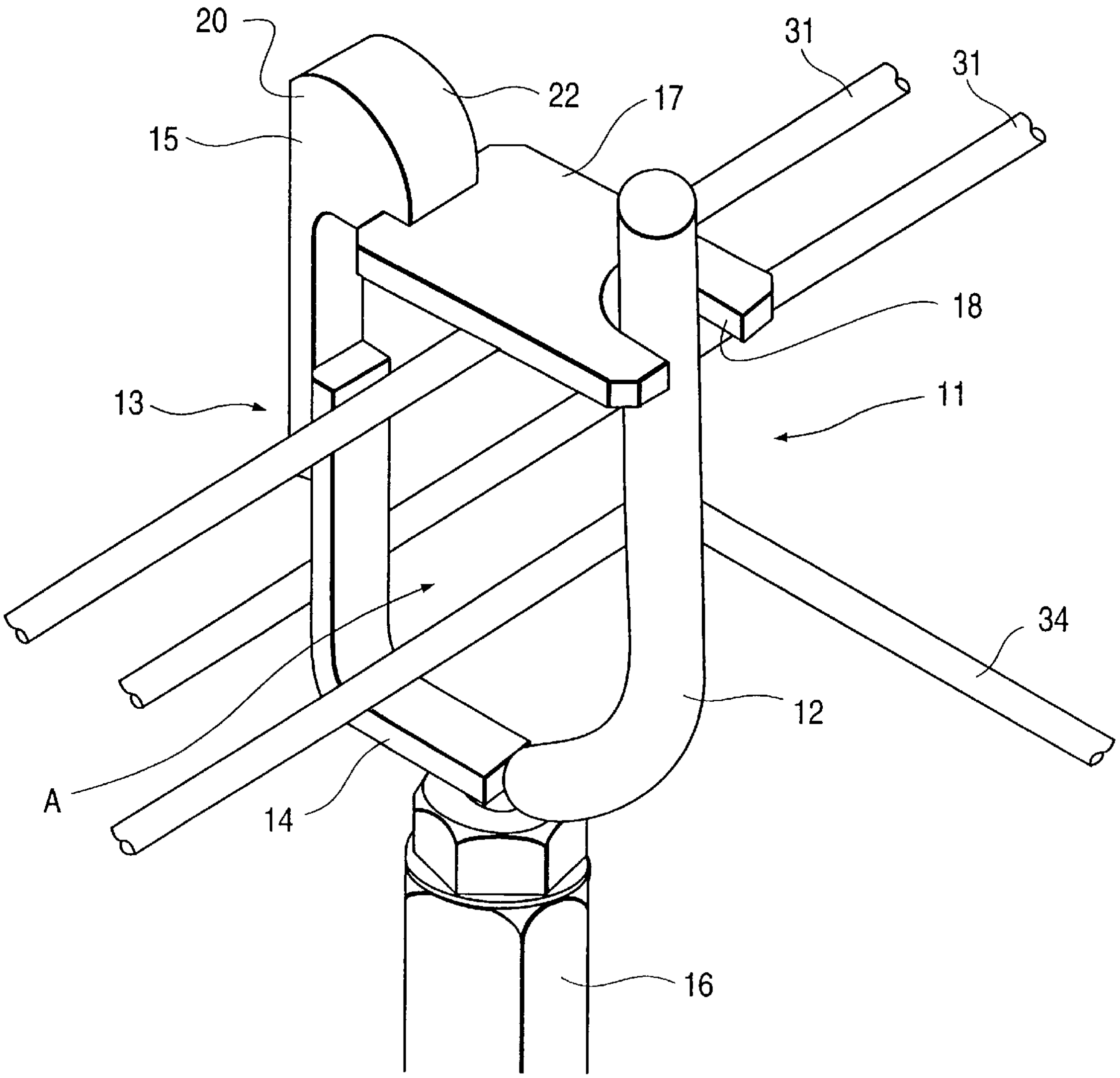
FIG. 1 is a perspective view of a first embodiment of the invention.

FIGS. 1 and 2 show a first embodiment of the invention. A fork 11 comprises a rigid leg 12 and a flexible leg 13, and defines a wire receiving space A. The flexible leg comprises a rigid lower portion 14 and a flexible upper portion 15 fixed thereto by a screw (not shown) or any other suitable means. The rigid leg 12 is of e.g. round steel bar, the lower portion 14 of flat steel strip and the upper portion 15 of a plastics material such as nylon or polypropylene.

The bottom portions of each leg are welded together and fixed to an upstanding post 16. A screw-threaded connection between the post 16 and the fork 11 can be provided to permit the orientation and height of the fork to be adjusted, and a lock nut can lock the parts in the desired relative position in a known manner.

A flexible leaf 17, of e.g. a synthetic rubber, extends from the upper portion 15 to the rigid leg 12 As illustrated, the free end of the leaf 17 is cut away to provide a recess 18 which accommodates the upper end of the leg 12.

Figure 2A:
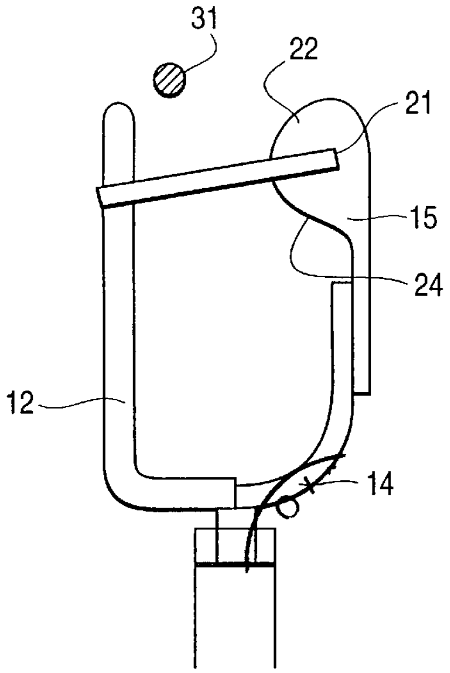
Figure 2B:
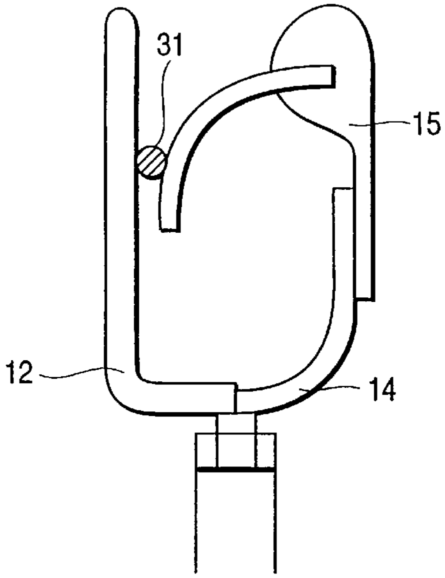

As best illustrated in FIG. 2*a,* the leaf is angled down towards the base of the fork so as to reduce the size of the space between the fork legs and to facilitate entry of an individual wire 31, as is explained further below. The leaf 17 is more flexible than the upper portion 15 The upper portion 15 has an enlarged tip 20 which bulges inwardly and has a slot 21 to accommodate one end of the leaf 17. The leaf is fixed in the slot by any suitable method, e.g adhesive. The tip 20 is necessary to retain the leaf 17 and has the advantage of reducing the opening of the fork 11, so helping to retain wires therein. Having the tip 20 bulging on the inside also reduces the lateral extent of the fork, so ensuring that several forks may be placed close together in use.

The tip 20 has a rounded outer guide surface 22 to facilitate entry and exit of wires from the fork 11 as will become apparent.

Figure 2C:
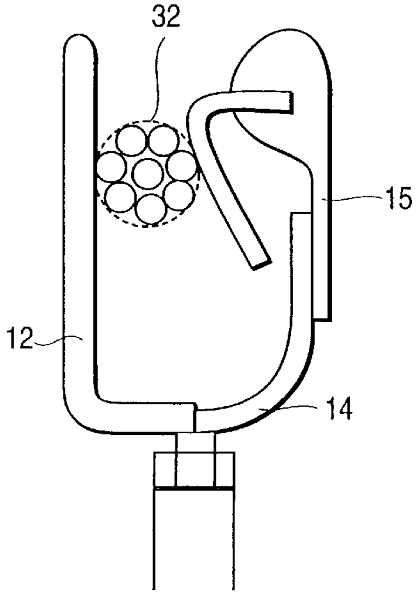

In use an individual wire 31 (FIG. 2*a*) is snapped downwardly into the fork 11 (FIG. 2*b*) by bending the leaf 17 as illustrated. A bundle of wires 32 can also be accommodated by bending of the leaf under the tip 20 (FIG. 2*c*). The rounded guide surface 22 facilitates smooth entry of wires into the fork.

Figure 2D:
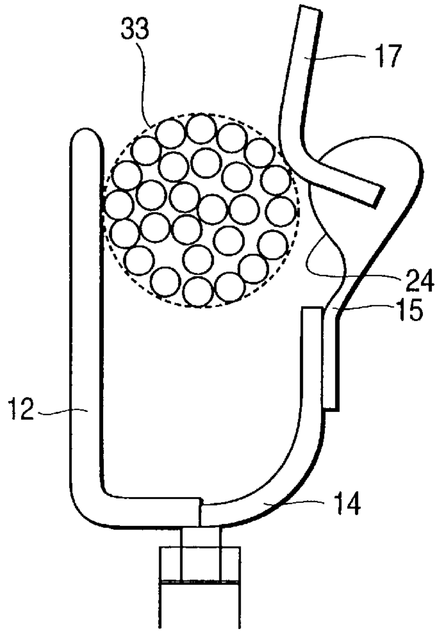

The completed harness 33 is a close fit in the fork 11 yet is easily removed as illustrated in FIG. 2*d,* the upper portion 15 bending outwardly. The rounded guide surface 24 under the tip 20 ensures that the wire bundle 33 is removed without risk of obstruction or damage. Whilst the tip 20 restricts the opening of the fork in its normal condition, it bends to permit exit of the completed harness, as clearly illustrated in FIG. 2*d.*

FIG. 1 illustrates a branch wire 34 located by turning outwards after the rigid leg 12, the rounded section of which ensures that damage to the wire insulation is avoided. In the case where branch wires approach from both directions, the embodiment of FIG. 1 is less useful since the leg 12 inevitably projects between the wires. In turn this makes binding close to the junction very difficult; a second embodiment of the invention, illustrated in FIGS. 3–5 overcomes this problem.

The second embodiment has two rigid arms 12*a,*12*b* spaced from each other to define a second wire receiving space B. The arrangement is otherwise as described with reference to the first embodiment.

The flexible leaf 17*a* closes both fork openings, which are substantially at right angles to one another. As clearly illustrated in FIGS. 3 and 5, the second embodiment can accommodate trunk wires 36, and branch wires 37,38 which approach from both directions along the trunk of the harness. The branch wires 37,38 are shown widely separated for illustration purposes, but in practice they would be a close fit between the legs 12*a,*12*b* and are easily bound close to the junction. The completed wire bundle can be removed with ease from the forks as previously described, and since the branch is opposite the tip 20 there is no additional restriction of movement.

A complete mounting post 16 is illustrated in FIG. 3 whereby the fork can be fixed to a board 39, and adjusted in both height and orientation.

FIG. 4 illustrates a variation of the second embodiment whereby the flexible arm 13*a* is connected to the rigid arms 12*a,*12*b* by a slotted connection 41. A look nut 42 can be released to permit the size of the fork to be adjusted to precisely accommodate the wire bundle, the flexible leaf 17*a* sliding between the rigid legs 12*a,*12*b*. Such an arrangement may be of value when holding harnesses of different diameter.

I claim:

1. Assembly device for releasably retaining the wires of a wire harness and comprising a fork having a first substantially rigid leg and a second leg having a lower rigid portion generally parallel to the first leg and an upper relatively flexible portion, the legs defining a space therebetween with an opening between the ends thereof, and a closure for said opening, the closure extending from one of said legs to the other leg so as to substantially close said opening, and the closure being adapted to open said opening to permit the passage of wires therethrough.

2. Device according to claim 1 wherein said closure is flexible and is mounted on one of said legs.

3. Device according to claim 2 wherein said closure comprises a resilient elastomeric leaf.

4. Device according to claim 2 wherein said closure inclines so as to reduce the size of said space.

5. Device according to claim 3 wherein said closure inclines so as to reduce the size of said space.

6. Device according to claim 1 wherein said closure is mounted on said relatively flexible leg.

7. Device according to claim 6 wherein said closure is substantially more flexible than said flexible leg.

8. Device according to claim 1 wherein said relatively flexible leg comprises a flexible limb and an enlarged tip to narrow said opening, a smooth guide surface being provided between said limb and said tip so as to facilitate removal of wires from said space.

9. Device according to claim 8 wherein, on the inner side of the fork said enlarged tip has a smooth guide surface to guide wires into the fork.

10. Device according to claim 1 and including a third substantially rigid leg defining with said first substantially rigid leg a second space therebetween and an opening between the ends thereof, the second space being substantially orthogonal to said space, and said closure extending between the ends of said legs to substantially close the openings of said spaces.

11. Device according to claim 1 wherein said first and second legs are connected at the base thereof by a releasable connection whereby said space can be enlarged.

* * * * *